US008446374B2

(12) United States Patent
Westerman (10) Patent No.: US 8,446,374 B2
(45) Date of Patent: May 21, 2013

(54) DETECTING A PALM TOUCH ON A SURFACE

(75) Inventor: Wayne Carl Westerman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1022 days.

(21) Appl. No.: 12/269,823

(22) Filed: Nov. 12, 2008

(65) Prior Publication Data

US 2010/0117961 A1 May 13, 2010

(51) Int. Cl.
*G06F 3/033* (2006.01)
*G06F 3/041* (2006.01)

(52) U.S. Cl.
USPC .......................................... 345/173; 345/163

(58) Field of Classification Search
USPC ........................... 345/163, 173, 174, 175, 176
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,764,222 A | 6/1998 | Shieh | |
| 5,790,104 A | 8/1998 | Shieh | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 2003/0080946 A1* | 5/2003 | Chuang .......................... | 345/173 |
| 2005/0275637 A1* | 12/2005 | Hinckley et al. ............... | 345/173 |
| 2006/0025218 A1* | 2/2006 | Hotta .............................. | 463/37 |
| 2006/0026521 A1 | 2/2006 | Hotelling et al. | |
| 2006/0097991 A1 | 5/2006 | Hotelling et al. | |
| 2006/0197753 A1 | 9/2006 | Hotelling | |
| 2007/0139395 A1* | 6/2007 | Westerman et al. ........... | 345/173 |
| 2007/0152966 A1* | 7/2007 | Krah et al. ..................... | 345/163 |
| 2007/0152976 A1* | 7/2007 | Townsend et al. ............. | 345/173 |
| 2007/0176906 A1* | 8/2007 | Warren .......................... | 345/173 |
| 2008/0012835 A1 | 1/2008 | Rimon et al. | |
| 2009/0174679 A1 | 7/2009 | Westerman | |

FOREIGN PATENT DOCUMENTS

| | | |
|---|---|---|
| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI '92, pp. 659-660.
Westerman, Wayne, Hand Tracking, Finger Identification, and Chordic Manipulation on a Multi-Touch Surface, Spring, 1999.
U.S. Appl. No. 12/242,772, Selective Rejection of Touch Contacts in an Edge Region of Touch Surface, filed Sep. 30, 2008.

* cited by examiner

*Primary Examiner* — Joseph Haley
*Assistant Examiner* — Andrew Sasinowski
(74) *Attorney, Agent, or Firm* — Morrison & Foerster LLP (57) ABSTRACT

The detection of a palm touch on a touch surface, such as a mouse surface, is disclosed. A palm touch can be determined as the touch on the touch surface that has a radius exceeding a predetermined palm touch radius. Alternatively, a palm touch can be determined as the touch on the touch surface located beyond the expected distance between finger touches.

20 Claims, 5 Drawing Sheets

DETECTING A PALM TOUCH ON A SURFACE

FIELD OF THE INVENTION

This relates to a touch sensitive mouse used as an input device for a computing system and, more particularly, to methods for detecting a palm touch on the mouse surface.

BACKGROUND OF THE INVENTION

Most computing systems can receive input from a user via an input device such as a mouse. The mouse can allow the user to move an input pointer, e.g., a cursor, in a user interface (UI) on a display screen of the computing system and to make a selection in the UI with the pointer, thereby triggering various operations in the computing system. The mouse can include a mechanism, such as an optical sensor, a trackball, a gyroscope, an accelerometer, and so on, for tracking its motion, which can be translated into signals that the computing system can use to move the input pointer in the UI. The motion of the mouse can generally correspond to the motion of the input pointer in the UI. Thus, by moving the mouse on a surface, the user can move the input pointer in similar directions in the UI.

The mouse can also include a mechanism, such as a click button, a scroll wheel, a touch panel, and so on, for data selection in the UI, which can be translated into signals that the computing system can use to select display elements in the UI corresponding to various operations in the computing system. Click buttons and scroll wheels, as physically manipulable mechanisms, can simply rely on the user to press or rotate them to perform data selection. Touch panels, on the other hand, can rely on the user to make a recognizable gesture on a touch surface of the touch panel to perform data selection.

Since certain fingers can perform certain gestures, which can be associated with particular operations of the computing system, it is important to distinguish palm touches on the touch surface of the touch panel from finger and thumb touches so as to avoid the palm touch triggering the wrong operation on the computing system.

SUMMARY OF THE INVENTION

This relates to the detection of a palm touch on a touch surface, such as a mouse surface. In some embodiments, a touch at a farther distant location on the touch surface relative to other touches on the touch surface can be indicative of a palm touch. For example, an expected distance between finger touches can be determined. Any touch at a location beyond that expected distance can be considered a palm touch. In some embodiments, a touch having a larger touch radius relative to other touch radii can be indicative of a palm touch. For example, a predetermined palm touch radius can be set. Any touch have a radius that exceed the predetermined palm touch radius can be considered a palm touch.

DETAILED DESCRIPTION OF THE PREFERRED EMBODIMENTS

In the following description of preferred embodiments, reference is made to the accompanying drawings in which it is shown by way of illustration specific embodiments in which the invention can be practiced. It is to be understood that other embodiments can be used and structural changes can be made without departing from the scope of the embodiments of this invention.

This relates to detecting a palm touch on a mouse surface using a method that can take into account the location and size of the touch. A touch at a lower location on the mouse relative to other touches or having a larger touch radius relative to other touches can be indicative of a palm touch.

Although some embodiments of this invention may be described herein in terms of detecting a palm touch on a touch sensitive mouse, it should be understood that embodiments of this invention are not so limited, but are generally applicable to any input device utilizing touch and other types of sensing technologies.

Figure 1:
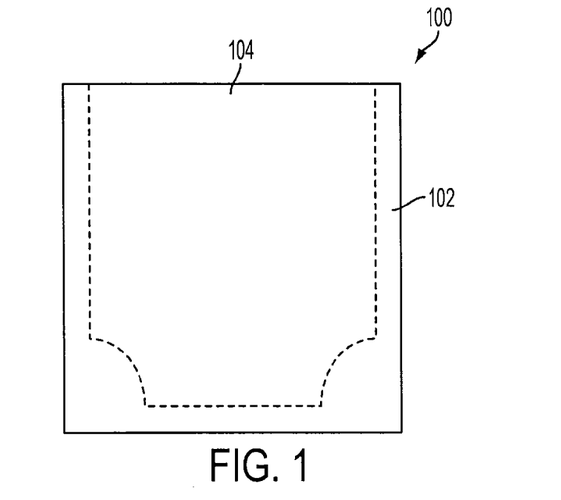
FIG. 1 illustrates an exemplary touch sensor panel indicating edge regions of the panel according to embodiments of the invention.

FIG. 1 illustrates an exemplary touch sensor panel indicating edge regions of the panel according to embodiments of the invention. Edge band 102 can be created around the boundaries of touch sensor panel 100, surrounding center area 104. In some embodiments, the edge band 102 can be 1 mm wide at the side and bottom edges of the panel 100 and have an 8 mm radius at the bottom corners of the panel. The edge band 102 can be used to help eliminate spurious or useless touches, as will be described below.

Figure 2:
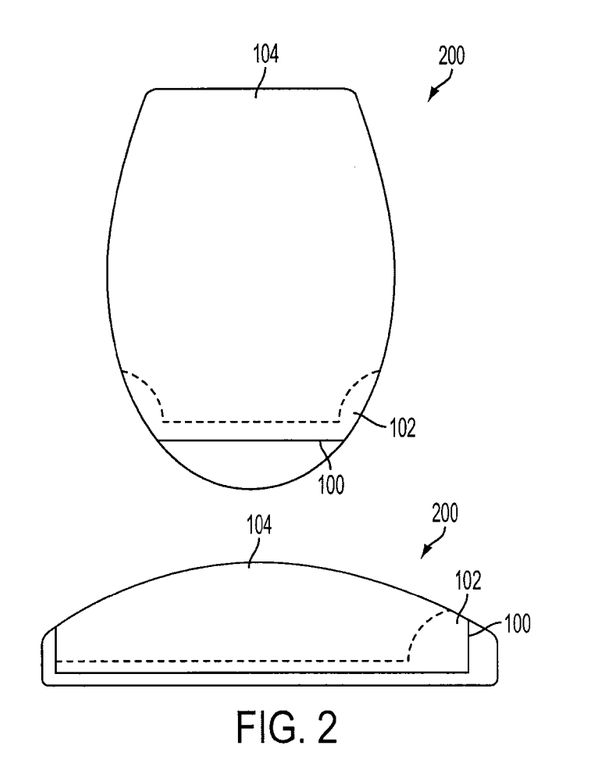
FIG. 2 illustrates top and side views of an exemplary touch sensitive mouse having a touch sensor panel as in FIG. 1 according to embodiments of the invention.

FIG. 2 illustrates top and side views of an exemplary touch sensitive mouse having a touch sensor panel as in FIG. 1 according to embodiments of the invention. Touch sensor panel 100 can be formed on the top and sides of touch sensitive mouse 200, except in those regions of the mouse where a user's touch is not expected to be utilized for mouse operations, e.g., at the very bottom edges of the mouse top and side surfaces. Edge band 102 can be created near the bottom edges of the top and side surfaces of the mouse 200. Center area 104 can be created on the top and upper side surfaces of the mouse 200. In some embodiments, the touch sensor panel 100 can be formed over the mouse top and side surfaces, ending about 2 mm from the very bottom edge of the top surface and about 1 mm from the very bottom edge of the side surfaces. Edge band 102 can be about 1 mm wide at the bottom edge of the panel 100 near the bottom edge of the top surface of the mouse 200, about 1 mm wide at the side edges of the panel in the bottom one-third of the side surfaces of the mouse, and about 8 mm in radius at the bottom corners of the panel near the bottom edges of the top and side surfaces of the mouse.

Figure 3A:
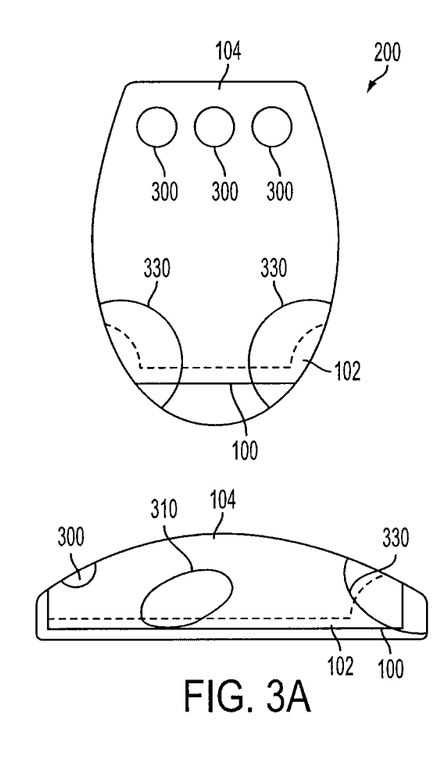
FIGS. 3a through 3c illustrate exemplary touches on top and side surfaces of a touch sensitive mouse as in FIG. 2 according to embodiments of the invention.

FIGS. 3a through 3c illustrate exemplary touches on top and side surfaces of a touch sensitive mouse as in FIG. 2 according to embodiments of the invention. In the example of FIG. 3a, touch sensitive mouse 200 can be touched with a right hand to produce a touch image indicating finger tip touches 300, thumb touch 310, and palm touches 330. This can represent a typical hand pose for either moving the mouse or simply resting the hand on the mouse. Finger tip touches 300 can be in the upper center area 104 of touch sensor panel 100 on the top surface of the mouse 200. Thumb touch 310 can straddle the side center area 104 and the side edge band 102 of the touch sensor panel 100 on the side surface of the mouse 200. Palm touches 330 can straddle the lower center area 104 and the bottom edge band 102 of the touch sensor panel 100 on the top and side surfaces of the mouse 200.

Figure 3B:
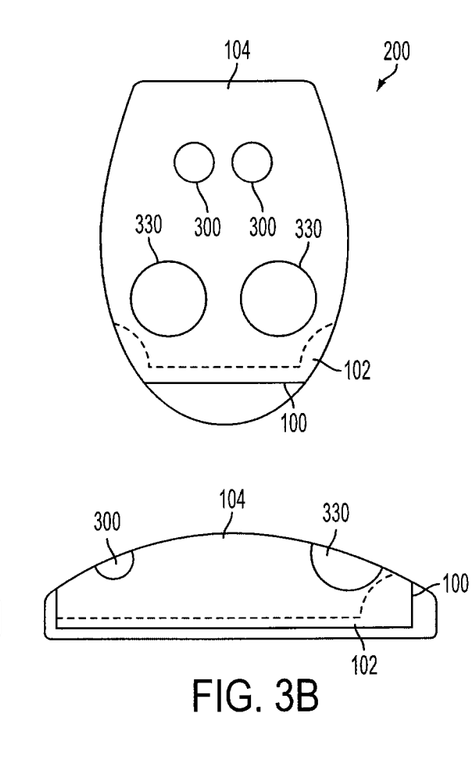

In the example of FIG. 3b, touch sensitive mouse 200 can be touched by the right hand to produce a touch image indicating finger tip touches 300 and palm touches 330. This can represent a typical hand pose at the beginning or ending of a "scroll" gesture (moving the fingers up or down) or a "finger zoom" gesture (moving the fingers together). Finger tip touches 300 can be in the upper center area 104 of touch sensor panel 100 on the top surface of the mouse 200. Palm touches 330 can be in the lower center area 104 of the touch sensor panel 100 on the top surface of the mouse 200.

Figure 3C:
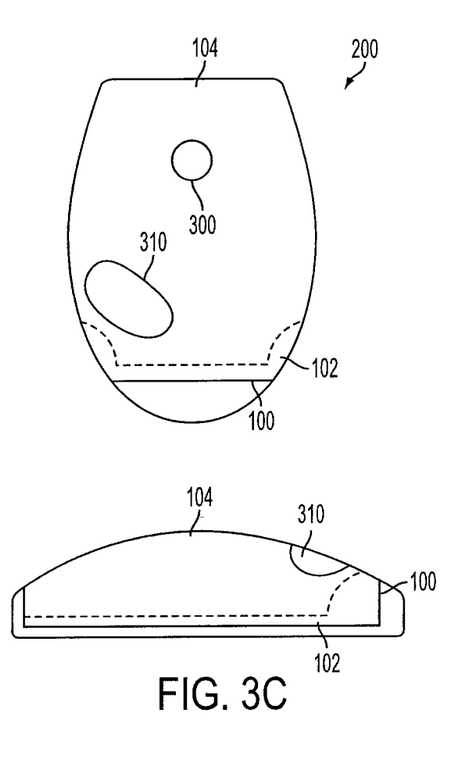

In the example of FIG. 3c, touch sensitive mouse 200 can be touched by the right hand to produce a touch image indicating finger tip touch 300 and thumb touch 310. This can represent a typical hand pose at the beginning of a "thumb zoom" gesture (moving the thumb and finger together). Finger tip touch 300 can be in the upper center area 104 of touch sensor panel 100 on the top surface of the mouse 200. Thumb touch 310 can be in the lower center area 104 of the touch sensor panel 100 on the top surface of the mouse 200.

Figure 4:
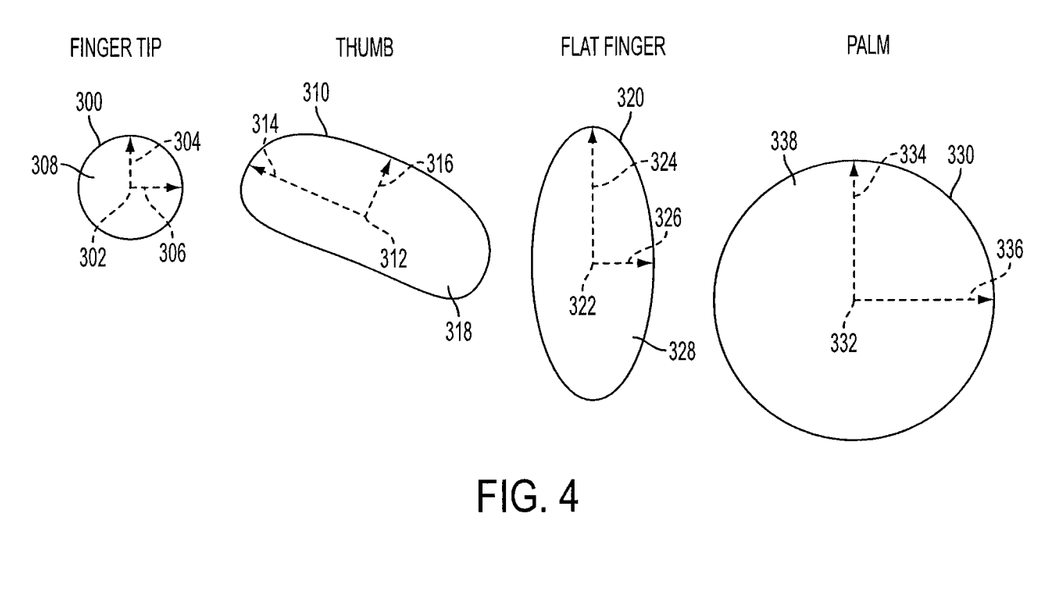
FIG. 4 illustrates exemplary touches as captured in a touch image that can be made on a touch sensitive mouse according to embodiments of the invention.

FIG. 4 illustrates exemplary touches as captured in a touch image that can be made on a touch sensitive mouse according to embodiments of the invention. Touch 300 as captured in a touch image can be defined as having centroid 302 at the center of mass of the touch with major and minor radii 304 and 306 defining the approximate boundaries of touch area 308. The touch 300 can have an elliptical, almost circular, shape, where the major and minor radii 304 and 306 can be approximately the same, indicative of a detected touch of a finger tip.

Touch 310 as captured in a touch image can be defined as having centroid 312 at the center of mass of the touch with major and minor radii 314 and 316 defining the approximate boundaries of touch area 318. The touch 310 can have an elliptical shape, where the major and minor radii 314 and 316 can be oriented substantially diagonally and the major radius can be longer than the minor radius, indicative of a detected touch of a thumb. The centroid 312 of the touch 310 can be farther along the major radius 314 than the centroid 302 of the touch 300, indicating a more elongated touch area. The touch area 318 of the touch 310 can also be larger than the touch area 308 of the touch 300.

Touch 320 as captured in a touch image can be defined as having centroid 322 at the center of mass of the touch with major and minor radii 324 and 326 defining the approximate boundaries of touch area 328. The touch 320 can have an elliptical shape, where the major radius 324 can be longer than the minor radius 326, indicative of a detected touch of a flat finger. The centroid 322 of the touch 320 can be lower in the y-direction than the centroid 302 of the touch 300, indicating a more elongated touch area. The touch area 328 of the touch 320 can also be larger than the touch area 308 of the touch 300.

Touch 330 as captured in a touch image can be defined as having centroid 332 at the center of mass of the touch with major and minor radii 334 and 336 defining the approximate boundaries of touch area 338. The touch 330 can have an elliptical, almost circular shape, where the major and minor radii 334 and 336 can be approximately the same and longer than the major and minor radii 304 and 306, indicative of a detected touch of a palm. The centroid 332 of the touch 330 can be lower in the y-direction than the centroids of the other touches. The major and minor radii 334 and 336 can be longer than the radii of the other touches. The touch area 338 of the touch 330 can also be larger than the touch areas of the other touches.

It is to be understood that hand and finger poses are not limited to those illustrated herein, but may include any poses that can be made on a touch sensitive mouse according to embodiments of the invention. It is further to be understood that the touch surface is not limited to a mouse surface, but may include any input device's touch surface capable of receiving hand and finger poses according to embodiments of the invention.

Figure 5:
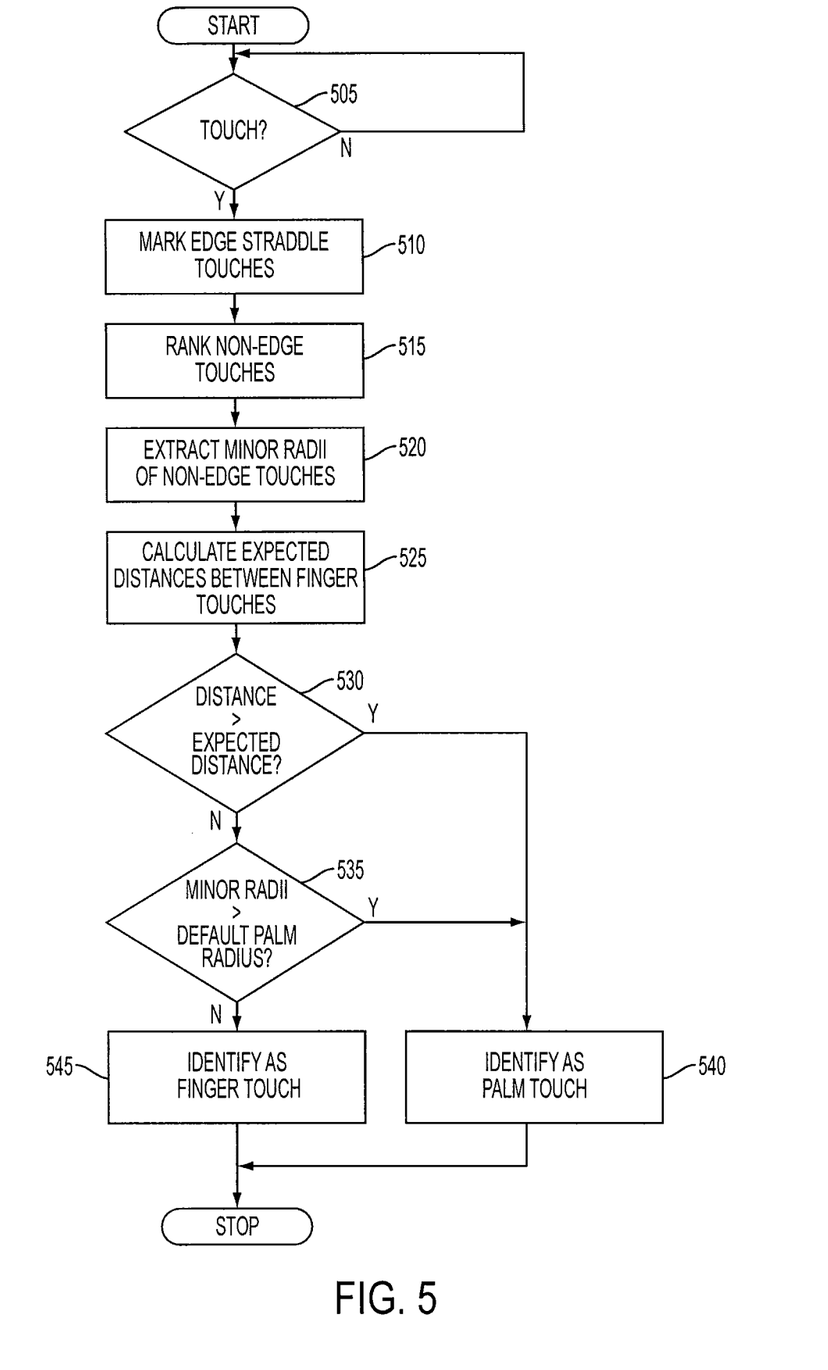
FIG. 5 illustrates an exemplary method for detecting a palm touch on a touch sensitive mouse according to embodiments of the invention.

FIG. 5 illustrates an exemplary method for detecting a palm touch on a touch sensitive mouse according to embodiments of the invention. In the example of FIG. 5, a determination can be made whether there have been one or more touches on a surface of the touch sensitive mouse (505). Generally, multiple touches can be made substantially simultaneously on the touch surface. If there have been one or more touches, a touch image can be captured to indicate the touches (such as those shown in FIG. 4) made on the touch surface.

Those touches that either straddle the center area and the edge band of the mouse touch surface or rest within the edge band can be marked (510). Marking of touches is disclosed in U.S. patent application Ser. No. 12/242,772 entitled "Selective Rejection of Touch Contacts in an Edge Region of a Touch Surface," the contents of which are incorporated herein by reference in their entirety for all purposes. The markings can indicate those touches that can generally be ignored as either spurious or useless in determining gestures. For example, thumb touch 310 and palm touches 330 in FIG. 3a can be ignored since they straddle the center area and the edge band of the mouse touch surface.

The remaining touches, i.e., the non-edge touches, that are in the center area of the mouse touch surface can be ranked based on their y-coordinates in the touch image (515). For example, the topmost touch in the image can be ranked as "1," the second topmost touch can be ranked as "2," and so on, down to the bottommost touch in the image.

The minor radii for the ranked touches can be extracted from the touch image (520). This can be done using standard signal processing techniques. As shown in FIG. 4, the minor radius of a palm touch can be discernibly larger than the minor radii of finger tip, thumb, and flat finger touches. This size difference can be used to detect a palm touch, as will be described below.

The topmost touch can be assumed to be made by a finger because a palm generally cannot touch near bottom center of the mouse touch surface unless fingers are also touching the surface. Based on the physical structure of the hand and constraints on hand poses imposed by the mouse, the expected distance between finger touches on the mouse can be calculated (525). Any touches beyond the expected distances are likely palm touches. As such, the expected distance can be considered as a palm threshold distance.

For example, two touches could be made on the mouse touch surface by two fingers, a (top) finger and a thumb, or a (top) finger and a palm. The lower (i.e., the second) touch's expected palm threshold distance $d_2$ from the topmost touch can be set fairly large to accommodate separation in the case of a finger and a thumb of about 60 to 70 mm. A separation beyond that can indicate a finger and a palm. Three touches made on the mouse touch surface by two fingers and a thumb may not be supported because the two fingers and thumb may not comfortably fit on the mouse in a way that can provide a usable gesture. If this two-finger-thumb configuration is not supported, the remaining three touches that could be made on the mouse touch surface include three fingers, two fingers and a palm, or one finger and two palms (i.e., two touches by the same palm). Since the expected vertical separation for three fingers is smaller than the expected vertical separation for a finger and a thumb, the lower (i.e., the third) touch's expected palm threshold distance $d_3$ from the topmost touch can be somewhat smaller than $d_2$. Four touches from four fingers may only fit on the mouse touch surface if the fingers are scrunched together. As such, the lower (i.e., the fourth) touch's expected palm threshold distance $d_4$ from the topmost touch can be as small as or smaller than $d_3$. For five or more touches, the lower (i.e., fifth or more) touch's expected palm threshold distance $d_5$ from the topmost touch can be at least as small as $d_4$. Accordingly, $d_2 > d_3 > d_4 \geq d_5$. In some embodiments, $d_2$ can be 66 mm, $d_3$ 44 mm, and $d_4$ and $d_5$ 22 mm.

The y-coordinate of the topmost touch in the touch image can be used as a reference when identifying lower touches in the image. A determination can be made whether the distance between the topmost touch and a ranked lower touch is greater than the expected distance $d_r$ as calculated above (530). The determination can be made as follows.

$$|y_1 - y_r| > d_r \text{ indicates palm.} \quad (1)$$

Here, $y_r$ is the y-coordinate of the lower rth ranked touch, $y_1$ is the y-coordinate of the topmost touch, and $d_r$ is the expected distance between fingers for that rank as calculated in step 525. Accordingly, if the y-coordinate of the lower touch is farther away from the y-coordinate of the topmost touch than the expected distance, then the lower touch can be identified as a palm touch (540).

A determination can be made whether the extracted minor radius of each touch in the touch image is greater than a default palm minor radius (535). If so, the touch can be identified as a palm touch (540). In some embodiments, a default palm minor radius can be 13 mm.

If neither the minor radius of a touch nor the distance between the topmost touch and the touch indicates that the touch is a palm, the touch can be identified as a finger touch (545).

For example, palm touches 330 in FIG. 3b can be identified and later ignored as not being part of a scroll or finger zoom gesture made by finger touches 300. Thumb touch 310 in FIG. 3c can be identified as not being a palm touch and as being part of a thumb zoom gesture made with finger touch 300.

It is to be understood that the methods for palm detection are not limited to those described herein, but may include other or additional steps capable of performing palm detection according to embodiments of the invention.

Figure 6:
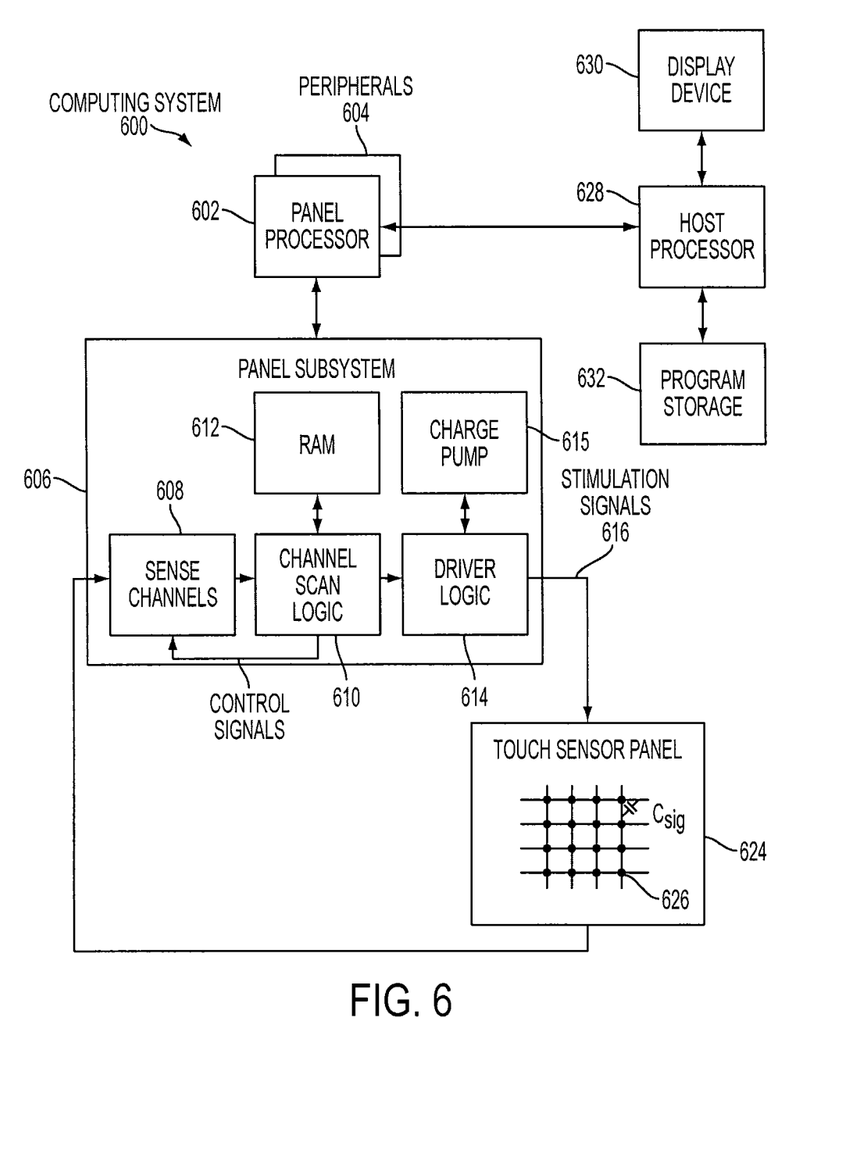
FIG. 6 illustrates an exemplary computing system implementing the algorithm for detecting a palm touch on a touch sensitive mouse according to embodiments of the invention.

FIG. 6 illustrates an exemplary computing system implementing the algorithm for detecting a palm touch on a touch sensitive mouse according to embodiments of the invention. In the example of FIG. 6, computing system 600 can include one or more panel processors 602, which can execute software or firmware implementing the algorithm for palm detection according to embodiments of the invention, and peripherals 604, and panel subsystem 606. Peripherals 604 can include, but are not limited to, random access memory (RAM) or other types of memory or storage, watchdog timers and the like. Panel subsystem 606 can include, but is not limited to, one or more sense channels 608, channel scan logic (analog or digital) 610 and driver logic (analog or digital) 614.

Channel scan logic 610 can access RAM 612, autonomously read data from sense channels 608 and provide control for the sense channels. In addition, channel scan logic 610 can control driver logic 614 to generate stimulation signals 616 at various phases that can be simultaneously applied to drive lines of touch sensor panel 624. Panel subsystem 606 can operate at a low digital logic voltage level (e.g. 1.7 to 3.3V). Driver logic 614 can generate a supply voltage greater that the digital logic level supply voltages by cascading two charge storage devices, e.g., capacitors, together to form charge pump 615. Charge pump 615 can be used to generate stimulation signals 616 that can have amplitudes of about twice the digital logic level supply voltages (e.g. 3.4 to 6.6V). Although FIG. 6 shows charge pump 615 separate from driver logic 614, the charge pump can be part of the driver logic. In some embodiments, panel subsystem 606, panel processor 602 and peripherals 604 can be integrated into a single application specific integrated circuit (ASIC).

Touch sensor panel 624 can include a capacitive sensing medium having a plurality of drive lines and a plurality of sense lines, although other sensing media can also be used. The drive and sense lines can be formed from a transparent conductive medium such as Indium Tin Oxide (ITO) or Antimony Tin Oxide (ATO), although other transparent and non-transparent materials such as copper can also be used. The drive and sense lines can be formed on a single side of a substantially transparent substrate, on opposite sides of the substrate, or on two separate substrates separated by the dielectric material. Each intersection of drive and sense lines can represent a capacitive sensing node and can be viewed as picture element (pixel) 626, which can be particularly useful when touch sensor panel 624 is viewed as capturing an "image" of touch. (In other words, after panel subsystem 606 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel).) The capacitance between the drive and sense lines and local system ground appears as a stray capacitance Cstray and the capacitance at the intersections of the drive and sense lines, i.e., the pixels, as a mutual signal capacitance Csig when the given drive line is stimulated with an alternating current (AC) signal. The presence of a finger or other object near or on the touch sensor panel can be detected by measuring changes to a signal charge present at the pixels being touched, which is a function of Csig. Each sense line of touch sensor panel 624 can drive sense channel 608 in panel subsystem 606.

Touch sensor panel 624 can cover a portion or substantially all of a surface of an input device, such as a mouse.

Computing system 600 can also include host processor 628 for receiving outputs from panel processor 602 and performing actions based on the outputs that can include, but are not limited to, moving one or more objects such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 628 can execute software or firmware implementing the algorithm for palm detection according to embodiments of the invention. Host processor 628 can also perform additional functions that may not be related to panel processing, and can be coupled to program storage 632 and display device 630 such as an LCD display for providing a UI to a user of the device. Display device 630 together with touch sensor panel 624, when located partially or entirely under the touch sensor panel, can form a touch screen.

Note that one or more of the functions described above can be performed by firmware stored in memory (e.g. one of the peripherals 604 in FIG. 6) and executed by panel processor 602, or stored in program storage 632 and executed by host processor 628. The firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that the sensor panel is not limited to a touch sensor panel, as described in FIG. 6, but may be a proximity sensor panel or any other sensor panel capable of sensing a touch or hover event and detecting a palm touch according to embodiments of the invention. Furthermore, although the touch sensors in the touch sensor panel may be described herein in terms of an orthogonal array of touch sensors having rows and columns, it should be understood that embodiments of this invention are not limited to orthogonal arrays, but can be generally applicable to touch sensors arranged in any number of dimensions and orientations, including diagonal, concentric circle, and three-dimensional and random orientations. In addition, the touch sensor panel described herein can be either a single-touch or a multi-touch sensor panel.

An exemplary touch sensitive mouse 200 as in FIG. 2, including a touch sensor panel 624 on a mouse surface and other computing system blocks in the computing system 600 of FIG. 6, can be utilized to execute palm detection algorithms according to embodiments of the invention. In some embodiments, the mouse 200 can communicate with the computing system 600 via cable. In some embodiments, the mouse 200 can communicate with the computing system 600 via a wireless connection.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A method for detecting a non-input touch on a touch surface, the method comprising:
   receiving a plurality of touches substantially simultaneously on the touch surface, the touch surface having a top distal edge;
   selecting a first pair of the touches, the first pair including a first touch and a second touch;
   determining a first distance between the first touch and the second touch;
   comparing the first distance to a distance threshold;
   determining, based on the comparison, that the first distance exceeds the distance threshold; and
   classifying, based on the determination that the first distance exceeds the distance threshold, at least one of the first and second touches as a non-input touch;
   wherein determining the first distance comprises determining a vertical distance between the first and second touches, and classifying at least one of the first and second touches as non-input touches comprises:
      determining that the first touch is vertically lower than the second touch; and
      classifying the first touch as a non-input touch based on the determination that the first touch is vertically lower.

2. The method of claim 1, wherein the plurality of touches includes a third touch, the method further comprising:
   determining a distance of each of the plurality of touches to the top edge of the touch surface; and
   determining that the second touch is the touch nearest to the top edge of the touch surface,
   wherein selecting the first pair is based on the determination that the second touch is the touch nearest to the top edge of the touch surface.

3. The method of claim 1, further comprising:
   determining the number of touches; and
   calculating the distance threshold based on the number of touches.

4. The method of claim 1, further comprising:
   ranking the touches; and
   calculating the distance threshold based on the ranks of the touches.

5. The method of claim 4, further comprising:
   determining a vertical distance between each touch and the top edge,
   wherein the touches are ranked based on the vertical distance between the touch and the top edge.

6. The method of claim 5, wherein the touch nearest to the top edge is ranked higher than any other touch, and the touch farthest from the top edge is ranked lower than any other touch.

7. A computing system, comprising:
   an input device including a plurality of input sensors configured to detect substantially simultaneous touches on a surface of the input device, the surface having a top distal edge; and a processor in communication with the input device, the processor configured to
  receive a plurality of touches substantially simultaneously on the surface of the input device,
  select a first pair of the touches, the first pair including a first touch and a second touch,
  determine a first distance between the first touch and the second touch,
  compare the first distance to a distance threshold,
  determine, based on the comparison, that the first distance exceeds the distance threshold, and
  classify, based on the determination that the first distance exceeds the distance threshold, at least one of the first and second touches as a non-input touch;
wherein determining the first distance comprises determining a vertical distance between the first and second touches, and classifying at least one of the first and second touches as non-input touches comprises:
  determining that the first touch is vertically lower than the second touch; and
  classifying the first touch as a non-input touch based on the determination that the first touch is vertically lower.

8. The system of claim 7, wherein the plurality of input sensors is incorporated into a touch sensor panel disposed on the surface of the input device.

9. The system of claim 7, wherein the input device is incorporated in a computer mouse.

10. The system of claim 9, wherein the plurality of input sensors is incorporated into a touch sensor panel disposed on the surface of the mouse.

11. A method for detecting a non-input touch on a touch surface, the method comprising:
  receiving a plurality of touches substantially simultaneously on the touch surface, the touch surface having a top distal edge;
  selecting a first pair of the touches, the first pair including a first touch and a second touch;
  determining the number of touches;
  calculating a distance threshold based on the number of touches;
  determining a first distance between the first touch and the second touch;
  comparing the first distance to the distance threshold;
  determining, based on the comparison, that the first distance exceeds the distance threshold; and
  classifying, based on the determination that the first distance exceeds the distance threshold, at least one of the first and second touches as a non-input touch.

12. The method of claim 11, wherein determining the first distance comprises determining a vertical distance between the first and second touches, and classifying at least one of the first and second touches as a non-input touch comprises:
  determining that the first touch is vertically lower than the second touch; and
  classifying the first touch as a non-input touch based on the determination that the first touch is vertically lower.

13. The method of claim 12, wherein the plurality of touches includes a third touch, the method further comprising:
  determining a distance of each of the plurality of touches to the top edge of the touch surface; and
  determining that the second touch is the touch nearest to the top edge of the touch surface,
  wherein selecting the first pair is based on the determination that the second touch is the touch nearest to the top edge of the touch surface.

14. The method of claim 11, further comprising:
ranking the touches; and
calculating the distance threshold based on the ranks of the touches.

15. The method of claim 14, further comprising:
determining a vertical distance between each touch and the top edge,
wherein the touches are ranked based on the vertical distance between the touch and the top edge.

16. The method of claim 15, wherein the touch nearest to the top edge is ranked higher than any other touch, and the touch farthest from the top edge is ranked lower than any other touch.

17. A computing system, comprising:
  an input device including a plurality of input sensors configured to detect substantially simultaneous touches on a surface of the input device, the surface having a top distal edge; and
  a processor in communication with the input device, the processor configured to
    receive a plurality of touches substantially simultaneously on the surface of the input device,
    select a first pair of the touches, the first pair including a first touch and a second touch,
    determine the number of touches,
    calculate a distance threshold based on the number of touches,
    determine a first distance between the first touch and the second touch,
    compare the first distance to the distance threshold,
    determine, based on the comparison, that the first distance exceeds the distance threshold, and
    classify, based on the determination that the first distance exceeds the distance threshold, at least one of the first and second touches as a non-input touch.

18. The system of claim 17, wherein the plurality of input sensors is incorporated into a touch sensor panel disposed on the surface of the input device.

19. The system of claim 17, wherein the input device is incorporated in a computer mouse.

20. The system of claim 19, wherein the plurality of input sensors is incorporated into a touch sensor panel disposed on the surface of the mouse.

* * * * *